United States Patent [19]

Fukita

[11] Patent Number: 4,645,321
[45] Date of Patent: Feb. 24, 1987

[54] HOLDING APPARATUS FOR CAMERA

[75] Inventor: Susumu Fukita, Kawasaki, Japan

[73] Assignee: Canon Kabushiki Kaisha, Tokyo, Japan

[21] Appl. No.: 797,525

[22] Filed: Nov. 13, 1985

[30] Foreign Application Priority Data

Nov. 20, 1984 [JP] Japan .................................. 59-246534

[51] Int. Cl.⁴ .............................................. G03B 29/00
[52] U.S. Cl. ...................................... 354/82; 354/293; 40/21 C
[58] Field of Search ................... 354/82, 293; 224/908; 40/2 R, 21 R, 21 C, 6

[56] References Cited

U.S. PATENT DOCUMENTS

| 2,680,315 | 6/1954 | McHugh et al. | 40/21 C X |
| 2,911,743 | 11/1959 | Pokras | 40/21 C |
| 2,938,441 | 5/1960 | Klingenstein | 354/293 |
| 3,938,166 | 2/1976 | Sloop | 354/82 |
| 4,134,662 | 1/1979 | Kawazoe | 354/293 |
| 4,405,223 | 9/1983 | Shull | 354/82 X |

Primary Examiner—Michael L. Gellner
Attorney, Agent, or Firm—Fitzpatrick, Cella, Harper & Scinto

[57] ABSTRACT

A band having a back-of-the hand supporting member against which a back of the hand abuts is provided for a grip for holding a camera, and a transparent storing portion for storing a card with information is provided in the back-of-the hand supporting member.

1 Claim, 3 Drawing Figures

HOLDING APPARATUS FOR CAMERA

BACKGROUND OF THE INVENTION

1. Field of the Invention

The present invention relates to a holding apparatus for a still camera, a video camera, and the like and, more particularly, to a holding apparatus having a storing a portion for storing name plate or a card on which photography information is recorded.

2. Description of the Prior Art

Conventionally, an indication portion for indicating information such as a name, specifications and the like of a camera is directly printed on a camera main body or a lens main body. Alternatively, a metal name plate having such information is attached, or an indication portion is printed or embossed on a back-of-the hand supporting portion of a handgrip of a camera main body or a lens main body.

However, since characters or figures of an indication portion of this type are initially printed, it is difficult for a user to change the indication portion. When a user wants to attach personal information such as a company's name, a tradename, his name or the like, he must request the manufacturer to do so, or he must make a sticker or a name plate by himself so as to attach it on a camera, or he must directly print the information on an outer housing of a camera. Alternatively, a user writes the information on the outer housing of the camera with paint or an ink. However, when a sticker is attached to the camera, it may be removed. When a user makes a metal name plate and attaches it to the camera, it may be difficult to change it. In addition preparation of such a metal plate requires time and effort. When silk screen printing is directly done on a camera, it is very difficult to erase or change it.

Also, when the information is directly written on the camera with paint or ink, it is difficult to change it, and this results in an undesirable outer appearance.

SUMMARY OF THE INVENTION

The present invention has been made in consideration of the above drawbacks, and has as a first object to provide a camera or a holding apparatus for a camera having an information storing portion in which information associated with a camera can be easily altered.

Furthermore, it is a second object of the present invention to provide a compact camera.

DETAILED DESCRIPTION OF THE PREFERRED EMBODIMENT

Figure 1:
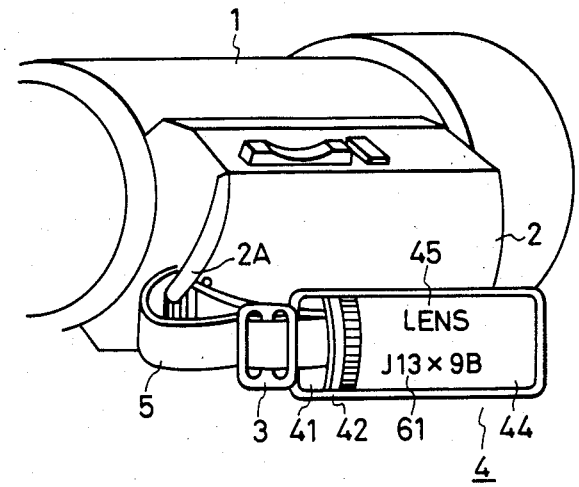
FIG. 1 is a perspective view when the present invention is applied to a handgrip portion of a lens.
Figure 2:
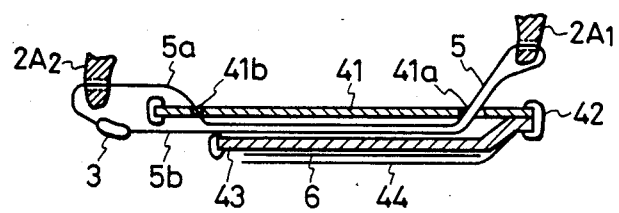
FIG. 2 is a sectional view of a part of FIG. 1.
Figure 3:
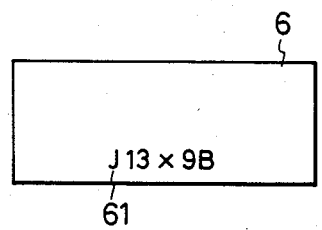
FIG. 3 is a view for explaining an embodiment of a sticker on which information is indicated.

An embodiment of the present invention will be described with reference to the accompanying drawings. FIG. 1 is a perspective view when the present invention is applied to a handgrip portion of a lens, FIG. 2 is a sectional view of the main part shown in FIG. 1, and FIG. 3 is an explanation view of an example of a card on which information is indicated.

Referring to FIG. 1, a band 5 supports the back of the hand of the user as an auxiliary supporting means when the user's hand holds a grip 2 for supporting a camera main body 1 or a lens driving portion 2. The band 5 is engaged with a through hole formed in an engaging portion 2A of the grip 2. A metal fastener 3 is used for fastening the band 5. A back-of-the hand supporting member 4 supports the back of the hand. A back-of-the hand supporting portion 41 is located between the back of the hand and the band 5. The portion 41 is made of leather or fabric so as to protect the back of the hand. A blind portion 43 covers band 5 from the sight to provide a good outer appearance. The supporting portion 41 and the cover 43 constitute a band storing portion, and the band 5 is passed through the band storing portion. Information such as characters or figures can be printed on a surface of the blind portion 43 opposite to a side at which the band 5 is passed. A transparent cover 44 is made of a transparent or semitransparent material, and has one open end. The cover 44 and the blind portion 43 form a transparent storing portion. Thus, a card 6 as an information carrier is stored in the transparent storing portion. Information 45 such as characters or figures can be printed on an inner or outer surface of the transparent cover 44. An edge portion 42 fixes the peripheral portion of the supporting portion 41 together with the blind portion 43 and the transparent cover 44 so as to improve an outer appearance of the supporting portion 41, the blind portion 43 and the transparent portion 44. The card 6 is stored in the transparent storing portion, and has information 61 such as characters, figures or symbols.

Through holes 41a and 41b are formed at two ends of the supporting portion 41 of the member 4. In order to hold the member 4 with the band 5, the band 5 is engaged with a hole formed in an engaging portion $2A_1$ of the grip, and the band 5 is inserted through the through hole 41a of the member 4 while portions 5a and 5b of the band 5 overlap each other. The portion 5a of the overlapping band 5 is guided outside the member 4 through the through hole 41b, and is passed through a hole of an engaging portion $2A_2$ of the grip. The other portion 5b of the band 5 is guided outside the member 4 through the open end of the band storing portion. Thereafter, the portions 5a and 5b are fastened by the metal fastener 3.

Note that in this embodiment, two or more information storing portions can be provided.

The operation with the above arrangement will be explained next.

A user forms the card 6 having desired information such as characters or figures and inserts it in a storing portion between the blind portion 43 and the transparent cover 44. Thus, since the cover 44 is transparent or semitransparent, the information 61 on the card 6 can be seen through the cover 44.

At the same time, when the information is printed on the blind portion 43, the information can be concealed by inserting the card 6.

In this embodiment, when, for example, the information 45 is printed on the transparent cover 44, if a background color of the card 6 is different from a color of the information 45, both the information 61 and 45 can be indicated.

On the other hand, when the background color of the card 6 is set to be the same as or similar to the color of the information 45, the information 45 cannot be externally recognized, and only the information 61 can be recognized. Note that when the surface of the transparent cover 44 considerably reflects light and prevents easy recognition, reflection preventive processing can be made on the surface of the transparent cover 44, thereby providing an indication which is easy to recognize.

As described above, according to the present invention, an indication bag-like portion consisting of a transparent cover is provided to a camera main body or to an accesory thereof. Thus, when a card with information inserted in the indication bag-like portion is replaced, different information can be indicated without requiring modification on the camera side. The information already printed can be desirably indicated or eliminated by changing a background color of the card.

When a plurality of video cameras of the same type are to be used at the same time, background colors of cards can be varied in accordance with the video cameras, thereby achieving easy discrimination.

In the present invention, the indication bag-like portion can be used for only storing information cards, but can be also used for storing small accessories.

In particular, according to the present invention, since a transparent storing portion extending along the longitudinal direction of the band 5 is provided to the nonskid band 5 of the grip 2 for holding the camera, types of a camera and/or a lens in use can be easily indicated, and an appropriate camera can be selected from a plurality of cameras without error.

Furthermore, when the band 5 is passed through the band storing portion constituted by the back-of-the hand supporting portion 41 and the blind portion 43 of the band 5, the transparent storing portion for storing the card 6 provided outside the blind portion 43 is arcuated along the back of the hand, thus preventing accidental removal of the card 6.

What is claimed is:

1. A holding apparatus for use with a camera or the like, comprising:
    a grip for holding a camera or the like, said grip being secured to the camera or the like and having an engaging portion at opposite ends thereof;
    a strap-like band having first and second ends, said ends being threaded through a hole in each said engaging portion;
    a fastener for fastening said first and second ends of said band;
    a back-of-the-hand supporting member including a back-of-the-hand supporting portion, a blind portion, and a transparent cover, said back-of-the-hand supporting portion formed with a hole at each end; and
    a transparent storing portion formed by said transparent cover and said blind portion, said transparent storing portion having a closed end portion at a first end thereof and an open end portion at a second end thereof and dimensioned to receive a card for displaying information,
    wherein one end of said band is threaded through the hole in a first end of said back-of-the-hand supporting portion, then through one of said engaging portions and back through the hole in said first end of said back-of-the-hand supporting portion,
    wherein both ends of said band are then directed to an open portion of a band storing portion so that the first end of said band is threaded through the hole provided in a second end of said back-of-the-hand supporting portion and then through the hole in the other of said engaging portions, and
    wherein the second end of said band is threaded through the open end portion of said band storing portion and fastened to said first end of said band with said fastener.

* * * * *